(12) United States Patent
Wang

(10) Patent No.: US 6,298,718 B1
(45) Date of Patent: Oct. 9, 2001

(54) TURBOCHARGER COMPRESSOR DIAGNOSTIC SYSTEM

(75) Inventor: Yue Yun Wang, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/521,873

(22) Filed: Mar. 8, 2000

(51) Int. Cl.[7] .................................................. G01M 15/00
(52) U.S. Cl. ............................................ 73/118.1; 701/100
(58) Field of Search ......................... 73/112, 116, 117.1, 73/117.2, 117.3, 117.4, 118.1; 701/99, 100, 101

(56) References Cited

U.S. PATENT DOCUMENTS

| | | |
|---|---|---|
| 4,277,830 | 7/1981 | Reid et al. . |
| 4,496,286 * | 1/1985 | Gagnon .............................. 73/862.35 |
| 4,604,701 | 8/1986 | Fujawa et al. . |
| 4,694,689 * | 9/1987 | Kawasaki ............................ 73/118.1 |
| 4,790,139 | 12/1988 | Roach . |
| 4,817,387 | 4/1989 | Lashbrook . |
| 4,977,743 | 12/1990 | Aihara et al. . |
| 5,235,954 | 8/1993 | Sverdlin . |
| 5,377,112 | 12/1994 | Brown, Jr. et al. . |
| 5,410,882 | 5/1995 | Davies et al. . |
| 5,539,638 | 7/1996 | Keeler et al. . |
| 5,541,857 * | 7/1996 | Walter et al. .......................... 73/660 |
| 5,585,553 | 12/1996 | Schricker . |
| 5,617,726 | 4/1997 | Sheridan et al. . |
| 5,682,317 | 10/1997 | Keeler et al. . |
| 5,698,780 | 12/1997 | Mizutani et al. . |
| 5,755,101 | 5/1998 | Free et al. . |
| 5,850,737 | 12/1998 | Aschner et al. . |
| 6,141,951 * | 11/2000 | Krukoski et al. . |

* cited by examiner

*Primary Examiner*—Eric S. McCall
(74) *Attorney, Agent, or Firm*—Barnes & Thornburg

(57) ABSTRACT

A system and method for detecting abnormal operation of a turbocharger compressor reads data from a plurality of sensors and first conducts a series of rationality tests on the sensor data. The tests determine whether the data generated by certain ones of the sensors is accurate or compromised. If a particular sensor fails its corresponding rationality test, an error signal is generated. On the other hand, if all sensor data passes the rationality tests, the compressor performance data is compared to a compressor operation map, and more particularly to surge and choke regions defined by boundary lines on the map. If certain compressor performance data falls into either the surge or choke region, an appropriate abnormal performance signal is generated. In certain embodiments of the invention, the sensor rationality tests are based on a predetermined second order polynomial relationship between two compressor operating parameter, such as mass air flow, boost pressure, turbo speed, etc. In another aspect, a third order polynomial relationship between mass air flow and compressor pressure ratio is used to diagnose an abnormal compressor condition.

20 Claims, 4 Drawing Sheets

TURBOCHARGER COMPRESSOR DIAGNOSTIC SYSTEM

BACKGROUND OF THE INVENTION

The present invention concerns turbocharger systems, such as systems for use with automotive engines. More particularly, the invention concerns a system for diagnosing abnormal compressor performance within the turbocharger.

Turbochargers for diesel and gasoline engines are well known. In a typical automotive turbocharger, radial inflow turbines are driven by engine exhaust gas. The turbine then drives a radial compressor that increases the pressure of intake air provided to the engine. It has been found that under certain operating conditions, the use of a turbocharger improves overall engine efficiency and provides increased power, particularly during vehicle acceleration.

The automotive turbocharger operates in the manner of a centrifugal compressor to provide intake air to the engine at pressures above atmospheric. The performance of the compressor element of a typical automotive turbocharger is usually represented by a pressure ratio versus volume flow graph, with compressor efficiency values superimposed. A performance map of a typical centrifugal compressor is depicted in FIG. 2. The overall shape of the map, as defined by the constant speed and constant efficiency lines, is the product of years of empirical development to tailor the characteristics of the compressor to particular engine air requirements. The boundary of the compressor map is determined by the air requirements of the engine within a particular speed range, typically between the idle speed and the full rated load speed.

The left and right boundaries of the compressor map define a surge line and a choke line, respectively. Both of these lines define a limit of stable operation for the turbocharger or compressor. Referring to FIG. 2, reducing air flow to the compressor within the "surge region" to the left of the surge line, produces intermittent pulsation and interruption of steady air flow through the compressor. Increasing the inlet air flow to the right of the compressor map, namely within the "choke region", causes the overall efficiency of the compressor to fall to very low values. In either case, namely with air flow falling within either the surge or choke regions, the output or performance of the compressor is not properly matched to the specific engine.

Turbocharger operation within either the surge or choke regions can result from various failures in the engine control and operation system, such as a leak in the air intake system. In addition, passage into these regions can occur during normal operation of the turbocharger and engine, but when subject to extreme environmental conditions. For instance, a turbocharger exhibits a well known "altitude-compensating" ability in which the turbocharger automatically speeds up and supplies an additional volume of less dense air to the engine as the vehicle is operated at increasing altitudes. However, the typical automotive turbocharger has a limit to its altitude-compensating characteristic. In a typical case, operation at altitudes above 12,000 feet can lead to compressor surge, which can interrupt the air supply to the engine, thereby causing loss of power, excessive exhaust smoke and high exhaust temperature.

Compressor surge or choke conditions can be overcome by modifying the engine operation. For example, a surge condition can be corrected by derating the engine fuel, or by increasing the engine speed to thereby increase the mass air flow through the turbocharger. At the other end of the spectrum, a compressor choke condition can be alleviated by derating engine speed. While altering the engine operation can overcome a surge or choke condition, it does so at a cost to engine performance and fuel economy. It is therefore important to accurately detect the existence of a compressor abnormal condition to avoid unnecessary modification of the engine operation.

The identification of a compressor abnormal operating condition is achieved using data from sensors throughout the power plant system. If the data is suspect, an abnormality may be misdiagnosed, or simply missed. It is therefore important to verify the information used to determine the existence of a compressor surge/choke condition. It is equally important to have a compressor diagnosis system and method that provides an accurate measure of the compressor performance. The need exists in the arena of turbocharger systems, particularly for automotive use, for such a diagnosis system and method.

SUMMARY OF THE INVENTION

In order to address this need for diagnosing abnormal turbocharger compressor operation, the present invention contemplates a system and method that first determines whether the sensor data used to gauge compressor performance is accurate. Thus, in one aspect of the invention, the data generated by a plurality of condition sensors is subject to a sequence of rationality tests. In these tests, data generated by particular one of the sensors is compared to a predetermined sensor rationality map. The map defines a region of normal operation bounded by upper and lower boundary lines. If the sensor data falls outside the boundary lines, the sensor fails the rationality test and an error signal is generated.

On the other hand, if one sensor passes its rationality test, a next successive sensor is then subject to its own rationality test. In accordance with the preferred embodiment of the invention, the rationality test for successive sensors will utilize data generated by a previously tested sensor. Thus, the integrity of the data of this previously tested sensor must be verified to ensure a proper rationality test for the successive sensor. In one specific embodiment of the invention, data form the following sensors is ultimately involved in determining whether the compressor is operating normally: boost pressure; ambient pressure; turbo speed, ambient temperature; and mass air flow. In this specific embodiment, the rationality testing begins with the boost pressure sensor, followed sequentially by the ambient pressure, turbo speed/ambient temperature, and mass air flow sensors.

The integrity of the boost pressure sensor is evaluated first because the boost pressure sensor data is used with the ambient pressure data to calculate a pressure ratio. This pressure ratio calculated from the sensor data can be compared with a predetermined threshold pressure ratio value to test the ambient pressure sensor. Similarly, the integrity tests of the boost pressure and ambient pressure sensors precedes the rationality test for the turbo speed/ambient temperature sensors. In the preferred embodiment, the rationality test for the turbo speed and temperature sensors utilizes the actual compressor pressure ratio data for comparison to a sensor rationality map. In this map, the turbo speed is plotted as a function of pressure ratio, with the upper and lower boundary lines defining the region of normal sensor operation. In one feature of the invention, these boundary lines are established by a second order polynomial relating turbo speed to pressure ratio. In one specific embodiment, the turbo speed is normalized to the ambient temperature, so the rationality test can be used to verify the accuracy of both the turbo speed sensor and the ambient temperature sensor.

A similar approach can be taken to test the rationality of the mass air flow sensor data. This rationality test relies upon a sensor map that relates turbo speed to mass air flow, hence the requirement that the turbo speed sensor data be acceptable. A similar second order polynomial can be used to define the upper and lower boundaries of the sensor rationality map. If the sensor passes this last rationality test, then the mass air flow data is determined to be sufficiently accurate to be used in assessing the compressor performance.

In one feature of the invention, a similar rationality analysis is conducted using a compressor performance map. The map is bounded by a surge boundary and a choke boundary line, both of which relate mass air flow to pressure ratio. The actual pressure ratio value is obtained from the ratio of actual sensed boost pressure and actual sensed ambient pressure. If the actual mass air flow sensor value and calculated actual pressure ratio value falls outside the surge of choke boundary lines, the inventive system and method generates an error signal. This error signal can be provided to the engine control module, which can then make appropriate changes to the engine operating parameters to prevent the onset of these improper compressor performance events.

In one embodiment of the invention, the surge and choke boundary lines are defined by third order polynomials relating pressure ratio to mass air flow. In one aspect, the calculated pressure ratio obtained from the actual pressure sensor data is fed into the polynomial relationship to produce a calculate mass air flow. This calculated mass air flow can be compared with the actual sensed mass air flow. In one specific embodiment, the absolute value of the difference between the actual and calculated mass air flow values can be compared to a predetermined threshold value to determine whether a surge or choke condition is imminent. In another specific embodiment, the sign of the difference between these actual and calculated mass air flow values can be compared at different times. If the sign of this difference changes over successive time intervals, a surge or choke cycle can be identified.

It is one primary object of the invention to provide a system and method for evaluating the performance of a turbocharger compressor, and more specifically to determine whether the compressor is operating normally. A further object resides in the rationality testing protocol that verifies the integrity of the sensor data used to gauge the compressor performance.

One advantage of the present invention is that a more accurate diagnosis of the compressor performance can be obtained than with prior diagnostic systems. A further advantage is that the source of possible errors apart from the compressor itself can be more readily identified.

Other objects and benefits of the present invention will become apparent upon consideration of the following written description together with the accompanying figures.

DESCRIPTION OF THE PREFERRED EMBODIMENTS

Figure 1:
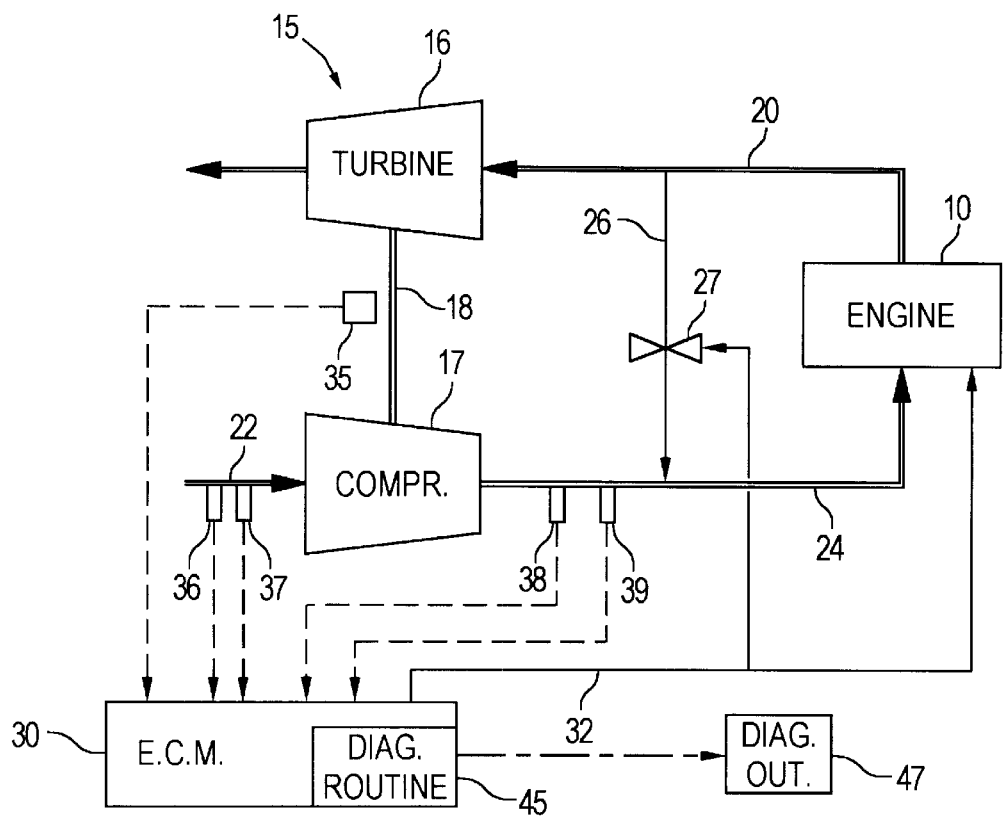
FIG. 1 is a schematic representation of an engine, engine control system and turbocharger arrangement according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

An engine and turbocharger system is depicted in FIG. 1. The system includes an engine 10 and associated turbocharger 15. The turbocharger includes a turbine 16 that drives a compressor 17 by way of a turbine shaft 18. Air is drawn into the compressor 17 through an air intake 22 and provided to the engine 10 by way of an intake manifold 24. Exhaust gas from the engine passes through manifold 20 to drive the turbine 16. In one typical system, an exhaust bypass 26 is provided between the exhaust manifold 20 and the intake manifold 24. The bypass 26 is controlled by an EGR valve 27 which selectively opens to re-circulate engine exhaust back through the engine 10.

The operation of the engine is governed by an engine control module (ECM) 30. Control signals 32 pass from the ECM 30 to various engine control components, such as air intake valves, fuel injector controllers, and the like. In order to generate the appropriate control signals, the ECM includes a range of software routines that receives information from various condition sensors throughout the engine and passes this information through engine control algorithms. With respect to the present invention, the ECM 30 receives a speed value from a turbo speed sensor 35, and ambient temperature value from sensor 36 and an ambient pressure value from sensor 37. The sensors 36 and 37 are preferably disposed at the air inlet 22 to determine the ambient air condition entering the compressor 17. In addition, the ECM 30 can receive signals from a mass air flow sensor 38 and a boost pressure sensor 39 disposed at the outlet of the compressor 17. More specifically, the sensor 38 and 39 can be interposed within the intake manifold 24 to determine the condition of the above ambient pressure air provided to the engine 10. All of the sensors can be of a variety of designs known in the industry. In accordance with the present invention, the ECM 30 includes a diagnostic software routine 45 that reads and evaluates the information provided by the various sensor 35–39. The routine preferably generates a diagnostic output 47 that can be in the form of real time values or a pass/fail indicator.

Figure 3:
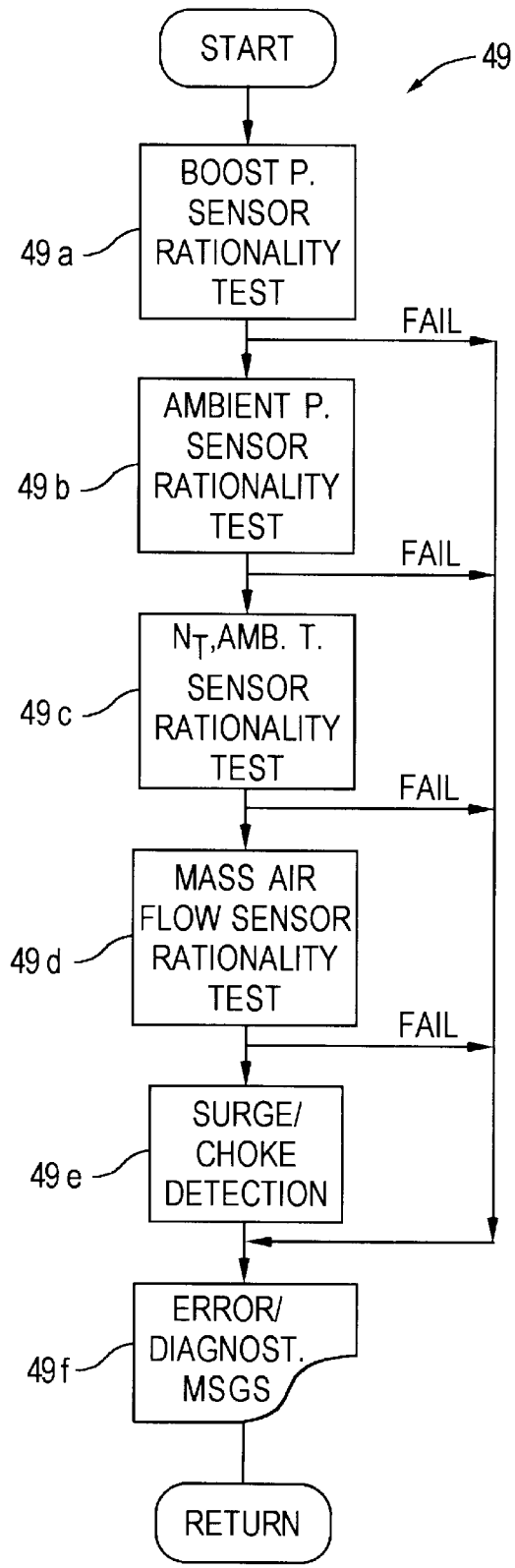
FIG. 3 is a flow chart of diagnostic steps accomplished by a compressor performance diagnostic routine according to one embodiment of the present invention.

In one aspect of the preferred embodiment of the present invention, the diagnostic software routine 45 within the ECM 30 implements a series of pattern recognition algorithms. These algorithms are used to conduct a number of rationality tests to first determine whether the sensor data being received by the ECM 30 is accurate, and then second to determine whether a surge or choke condition exists within the turbocharger 15. Thus, in accordance with one aspect of the invention, the diagnostic software routine 45 implements a sequence of steps 49, as depicted in the flow chart of FIG. 3. It is understood that this sequence of steps can be executed continuously as a background routine to the engine control software routines.

As illustrated in the flow chart, the first four steps are termed "rationality tests" for the various sensors providing data to the ECM for use by the diagnostic routine 45. Thus, in the first step 49a, data from the boost pressure sensor 39 is evaluated to determine whether the sensor is healthy or has experienced a failure. In the second step 49b, the same type of rationality test is applied to the ambient pressure sensor 37. In one embodiment of the invention, the third step 49c of the routine 49 jointly evaluates the turbine speed sensor 35 and the ambient temperature sensor 36 for failure or operate-ability. Finally, in the last rationality test 49d, the data provided by the mass air flow sensor 38 is studied. Details of these rationality tests follow.

In a preferred embodiment of the invention, each of the rationality tests constitutes a "pass/fail" test. If the test for the particular sensor 35–39 passes, the software flow continues to the next rationality test. On the other hand, if the test has failed, meaning that the sensor has failed or its data is suspect, control exits the normal flow and proceeds on a "fail" loop to an error/diagnostic message step 49f in the procedure. Thus, in accordance with the present invention, a particular hierarchy of sensor data is applied when evaluating the performance of the turbocharger. In the illustrated embodiment, the first sensor evaluated is the boost pressure sensor of 39. If that sensor has failed, meaning that the intake pressure information is suspect, then further evaluation is unnecessary. Likewise, evaluation follows of failures of the ambient pressure sensor, ambient temperature and turbine speed sensor, and finally mass air flow sensor. The sequence of evaluated sensors can be arranged in the order of importance to the compressor performance calculation.

Figure 2:
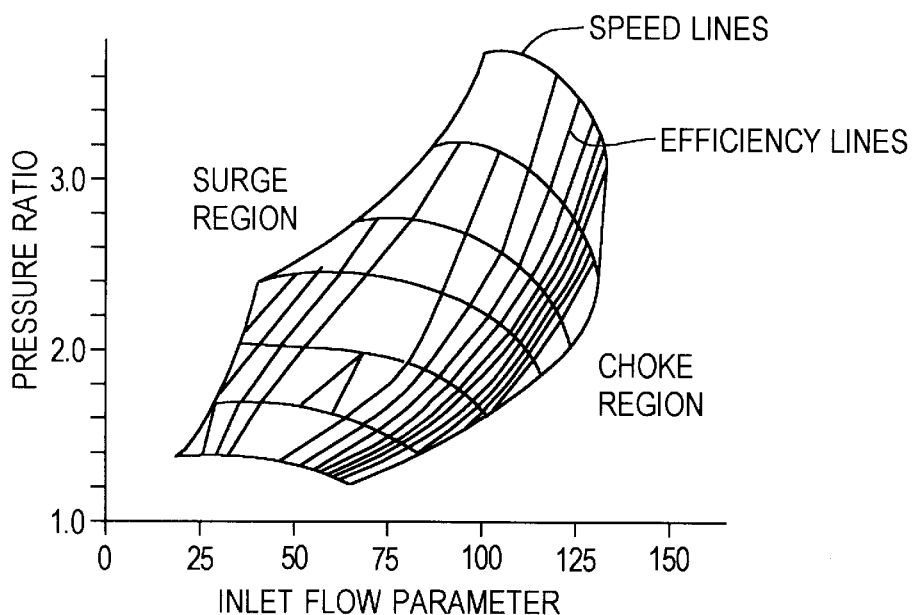
FIG. 2 is a compressor map for a typical automotive turbocharger.

If and when each of the rationality tests is passed, control in the procedure 49 can continue to be surge/choke detection step 49e. A similar approach to determining whether the compressor is operating in the surge or choke region (see FIG. 2) can be applied as is used in the prior rationality tests. If a surge or choke condition is detected, that condition can be expressed in the error/diagnostic message output in step 49f. In addition to generating a message, the diagnostic software routine 45 can provide signals to the engine control routines within the ECM 30 to correct the surge or choke condition. For example, if compressor surge has been detected, the engine fuel can be derated, or the engine speed increased, to thereby increase the mass air flow through the turbocharger. On the other hand, if a choke condition is detected, the engine control routines can be directed to derate the engine speed, increase the engine fueling, or close the EGR valve 27 to decrease the volume of intake air provided to the engine 10.

In accordance with one aspect of the invention, the first rationality test of step 49a is applied to the boost pressure sensor 39. The sensed boost pressure value can be compared to a predetermined threshold value as a function of the engine speed. For example, at engine low idle speed, the boost pressure (IMP) should be close to ambient pressure. On the other hand, at high engine speed and high load conditions, the boost pressure can be much higher. In one specific embodiment, the following conditionals are evaluated to determine a boost pressure sensor failure:

IF engine speed<low idle RPM & fueling<no load fueling & IMP>18 psia, then boost pressure sensor fails; or IF engine speed≅rated RPM & fueling>high load fuel & IMP<30 psia, then boost pressure sensor fails.

With this approach, the pressure threshold values (18 and 30) can be calibrated according to the specific engine operating parameters.

In the next step of the flow chart, the ambient pressure sensor is tested in step 49b. This rationality test preferably follows the boost pressure rationality test of step 49a because the boost pressure is used in the ambient pressure evaluation. More specifically, the measured ambient pressure and the boost pressure are used to calculate a compressor pressure ratio (PR), which can then be compared to predetermined threshold values. In accordance with this aspect of the invention, the pressure ration PR is obtained from IMP/ambP. At low engine speeds (i.e., engine low idle), the ideal pressure ratio should be close to 1.0. Taking into account the dynamic pressure effects of the engine intake manifold, a properly functioning ambient pressure sensor at low idle speed can yield a pressure ratio PR in the range of 0.8–1.4. Any pressure ration value falling outside that range is indicative of an ambient pressure sensor failure, causing an error signal to be generated in step 49f.

Figure 4:
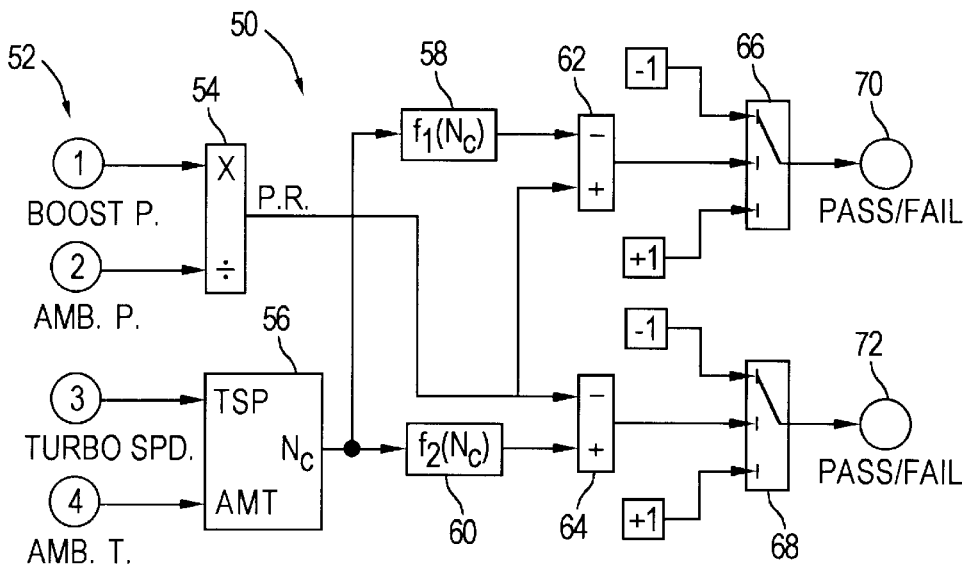
FIG. 4 is a block diagram representation of sensor rationality test according to one embodiment of the present invention.
Figure 5:
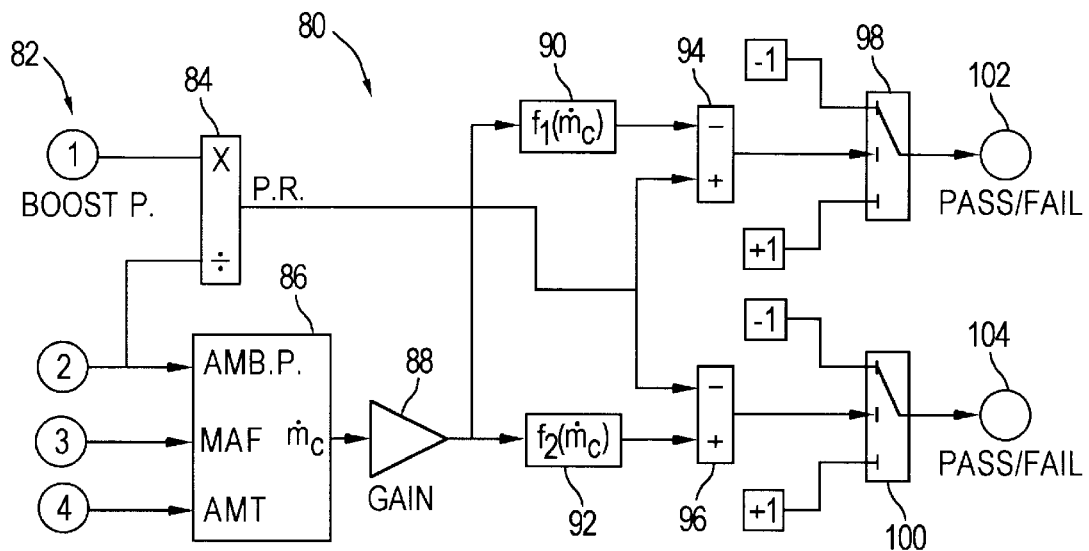
FIG. 5 is a block diagram representation of a second rationality test for diagnosing abnormal compressor operation, according to one embodiment of the present invention.

Specific rationality tests in accordance with a preferred embodiment of the present invention are illustrated in block diagrams in FIGS. 4 and 5. In the first diagram of FIG. 4, a turbo speed sensor/ambient temperature sensor rationality test 50 can be applied. This test 50 determines whether the compressor performance, as indicated by the turbo speed sensor 35 and ambient temperature sensor 36, falls within the shaded region of the rationality map shown in FIG. 6. In this map, a corrected turbocharger, or turbine shaft, speed is plotted against the pressure ratio across the turbocharger compressor. The shaded area is bounded by an upper boundary 105 and a lower boundary 106.

Referring to FIG. 4, the various sensor inputs are provided at input 52 to test 50. For this rationality test, the inputs are the boost pressure, as provided by sensor 39, the ambient pressure, as provided by sensor 37, the turbine speed obtained from sensor 35 and the ambient temperature generated by sensor 36. Of course, in accordance with the preferred embodiment of the invention, the boost pressure and ambient pressure sensors have already passed their own rationality tests. Thus, the data obtained from these sensors should be accurate, which narrows any error in the rationality test determination to the two subject sensors for turbo speed and ambient temperature. The boost pressure and ambient pressure inputs are passed through a multiply/divide module 54 to generate the pressure ratio.

Similarly, the turbine speed and ambient temperature (ambT) are passed through a correction module 56 to generate a corrected turbo speed, $N_c$. In the preferred embodiment, this corrected turbine speed $N_c$ is obtained dividing the measured turbine speed (TSP) by the square root of the ambient temperature $$(AMT) - \text{i.e., } N_c = \frac{TSP}{\sqrt{AMT}}.$$

It should be noted that the ambient temperature sensor value (AMT) is only used to calculate a corrected turbo speed. In ambient conditions in which the temperature does not vary significantly, this step can be eliminated. In the absence of the ambient temperature value, the range of acceptable turbo speed sensor values must be widened, so that some loss in diagnostic accuracy for the turbo speed rationality test will result.

Figure 6:
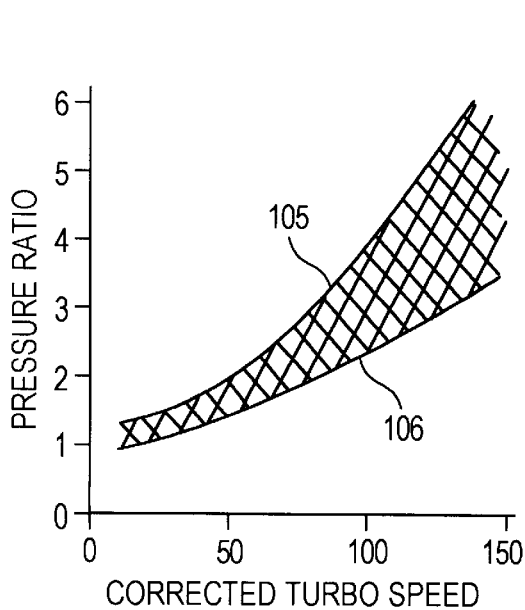
FIG. 6 is a diagnostic pattern recognition map used for one sensor rationality test according to one embodiment of the present invention.

In accordance with the present invention, the two boundary lines 105 and 106 of the corrected turbine speed versus pressure ratio map of FIG. 6, are determined by second order polynomials. These second order polynomials are incorporated within calculation modules 58 and 60. In the preferred embodiment, these polynomial calculation modules are used to apply the rationality test to determine sensor failure for the turbine speed or ambient temperature sensors. Specifically, the two polynomials determine a calculated pressure ratio as a function of corrected turbine speed. In accordance with a specific embodiment, these two functions have the following form:

$$f_1 = 0.0004 N_c^2 - 0.0134 N_c + 1.3453,$$

where $f_1$ is the upper boundary line, $$f_2 = 0.0002 N_c^2 - 0.0042 N_c + 0.92,$$

where $f_2$ is the lower boundary line.

These two polynomials, therefore define the boundary lines 105 and 106. A determination as to whether the measured boost pressure and/or ambient temperature values fall outside the shaded region of the map in FIG. 6, is determined first in the summation module 62. In this module, the upper boundary value is subtracted from the pressure ratio calculated based upon sensor inputs, and the difference is then applied to switch 66. If the difference exceeds a pre-determined value, the module 50 generates a failure signal at output 70. In other words, the switch 66 evaluates the relationship $P.R.-f_1 \geq "a"$, where "a" is a pre-determined calibratable value.

If this relationship is met, the signal at output 70 signifies that the boost pressure and ambient temperature sensor information yields a pressure ratio for the specific corrected turbine speed that is outside the map region. Under this circumstance, either the boost pressure sensor information is incorrect or the ambient temperature information is invalid. An error in boost pressure data leads to an erroneous calculated pressure ratio (P.R.), while a discrepancy in ambient temperature will infect the corrected turbine speed value $N_c$.

A similar rationality test is applied using the polynomial calculation module 60, the output of which is to provide to arithmetic module 64. Again, a pass-fail switch 68 yields a failure signal at output 72 if the difference between the lower boundary polynomial function output is significantly different from the calculated pressure ratio. Most preferably, the arithmetic module 64 and switch 68 evaluate the relation $f_2 - P.R. \geq "b"$, where "b" is a pre-determined calibratable value. In accordance with this feature of the invention, the pass/fail switches 66 and 68 can compare the output of the corresponding arithmetic modules 62 and 64 to a corresponding pre-determined calibration value "a" or "b". If the input supplied to the pass/fail switches exceeds those values, a failure condition is noted at the corresponding outputs 70 and 72.

Using this polynomial approach, a pattern in the input sensor data can be recognized. For example, it is well known that lower turbocharger speeds generate only lower pressure ratios, while higher turbo speeds generate higher pressure ratios. However, if at a higher pressure ratio, a very low turbine speed is measured, either the turbine speed sensor has failed or the ambient temperature sensor (which is used to determine the corrected turbine speed) has failed. In either case, a true measure of the compressor performance is not available and a failure conditions exists that must be evaluated by a turbocharger or engine technician.

The rationality test 50 can be modified to determine the validity of the mass air flow sensor data. Referring back to FIG. 3, it can be seen that the mass air flow sensor rationality test of step 49d follows the boost pressure, ambient pressure, ambient temperature and turbine speed rationality tests 49a–c. This sequence is important because the mass air flow sensor rationality test routine relies upon accurate inputs from the boost pressure sensor, the ambient pressure sensor and the ambient temperature sensor. Using this rationality test, the only unknown sensor quantity is generated by the mass air flow sensor.

In the illustrated embodiment, two switches, 66 and 68, and two outputs, 70 and 72, are utilized. It is of course understood that a single pass/fail output can be utilized to simply indicate whether the particular sensor information is suspect. On the other hand, providing the two outputs can help the engine technician diagnose the source of the problem with the sensor that is the root of the incorrect data signals.

The rationality test of FIG. 5 can be modified for the mass air flow sensor by substituting the mass air flow sensor data for the boost pressure data at the first of the inputs 52. In addition, the multiply/divide module 54 can be replaced with a calculation module, similar to the module 86 in FIG. 5, that receives the mass air flow, ambient pressure and ambient temperature sensor data as inputs. This modified calculation module can generate a corrected mass air flow value, instead of the pressure ratio value produced by the module 54 in connection with the turbo speed rationality test. Finally, this corrected mass air flow value is fed to the arithmetic processors 62 and 64 for comparison to the outputs from the polynomial calculation modules 58 and 60.

Figure 7:
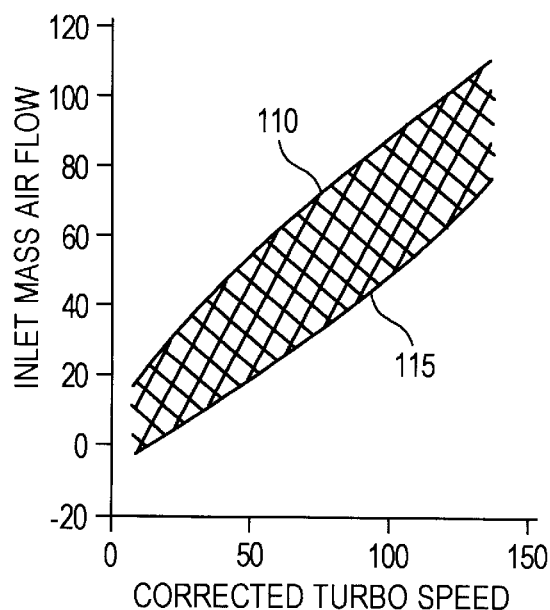
FIG. 7 a second diagnostic pattern recognition map used for a second sensor rationality test according to the present invention.

The polynomial calculation modules 58 and 60 can be modified to comply with the boundary lines 110 and 115, respectively, in the map FIG. 7. In this map, the corrected turbine speed is measured against the inlet mass air flow provided to the engine 10. Again, as with the map of FIG. 6, measured data falling within the shaded region of FIG. 7 exemplifies proper sensor and turbocharger performance. On the other hand, data falling outside this region, or more particularly above the boundary line 110 or below the boundary line 115, is indicative of an error or failure of the mass air flow sensor 38.

In one specific preferred embodiment of the invention, the two functions applied in modules 58 and 60 can be modified for the mass air flow rationality test as follows:

$$f_1 = c_{10} N_c^2 + c_{11} N_c + c_{12}$$

$$f_2 = c_{20} N_c^2 + c_{21} N_c + c_{22},$$

where $c_{xy}$ are predetermined constants that can be derived from curve fitting techniques. As illustrated in the map of FIG. 7, the result of the two polynomial equations above is a calculated mass flow rate as a function of the corrected turbo speed. If the difference between the calculated and corrected mass air flow values exceed predetermined thresholds, as determined in the switches 66 and 68, the appropriate error signals are generated at outputs 70 and 72.

Once all of the sensors have passed their corresponding rationality tests, a similar rationality analysis can be applied to determine whether the compressor is operating in an abnormal range. This rationality test is depicted in FIG. 5 and the corresponding map of FIG. 8. The same inputs are provided at input 82, as were provided for the rationality test in FIG. 4. The multiply/divide module 84 generates a pressure ratio signal (P.R.). The calculation module 86 generates a corrected mass air flow value ($\dot{m}_c$) Specifically, the actual measured mass air flow value (MAF) generated by sensor 38 is corrected to account for the ambient pressure and ambient temperature. In one specific embodiment, the corrected value $\dot{m}_c$ can be obtained from MAF $$\frac{\sqrt{ambT}}{ambP}.$$

Referring to FIG. 5, the resulting corrected mass air flow value, $\dot{m}_c$, is passed through a gain filter 88. This filtered and corrected mass air flow value is then applied to two polynomial calculation modules 90 and 92. The specific polynomials $f_1$ and $f_2$ evaluated in these modules generate a mass air flow value as a function of the pressure ratio (PR). As with the rationality test of FIG. 4, the rationality test for the compressor performance utilizes arithmetic processors 94 and 96 to determine whether the actual pressure ratio value falls above or below the calculated boundary lines. A pair of pass/fail switches 98 and 100 generate appropriate failure signals at the corresponding outputs 102 and 104.

Figure 8:
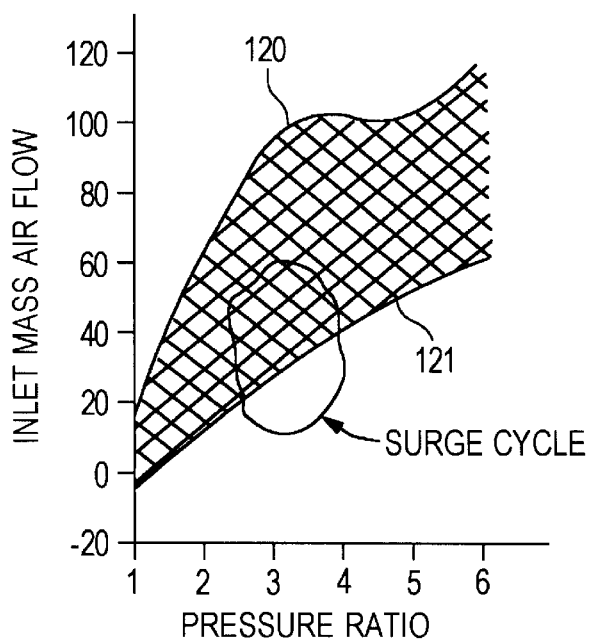
FIG. 8 is a third pattern recognition map used by the diagnostic routine according to one embodiment of the present invention to diagnose an abnormal compressor condition.

The map for a particular compressor can be of the form shown at FIG. 8 that plots pressure ratio against the inlet mass air flow. Acceptable compressor performance falls between the upper boundary line 120 and the lower boundary line 121. (Note that the x and y axis of the map in FIG. 8 are opposite to the axis in FIG. 2, hence the surge cycle region is below the shaded area, rather than above.) Using this rationality test, early and rapid detection of compressor surge and choke are possible. Rapid detection then allows quick response from the engine control module to alleviate or prevent the occurrence of compressor surge or choke. Again, it should be understood that the viability of the surge/choke detection step requires that all of the outputs from the sensors be accurate. Thus, it is important that the sensor rationality test depicted in the flow chart of FIG. 3 occur prior to making any evaluation of the actual compressor operation.

The two boundary lines 120 and 121 can be represented by third order polynomials in which corrected mass air flow is a function of pressure ratio. These polynomial equations are resolved in modules 90 and 92. In one embodiment of the invention, these equations can have the following form:

$f_1 = c_{10}PR^3 + c_{11}PR^2 + c_{12}PR + c_{13}$ $f_2 = c_{20}PR^3 + c_{21}PR^2 + c_{22}PR + c_{23}$, where $c_{xy}$ are predetermined constants that can be derived from curve fitting techniques. It has been found that a third order polynomial of the forms set forth above are adequate to define the upper and lower boundary lines for acceptable compressor performance.

In accordance with one aspect of the invention, the two functions $f_1$ and $f_2$ are used in two evaluations. In the first, a surge or choke trend is detected. For example, the appearance of a surge condition can be determined if the actual compressor operation is close to the lower boundary line 121. In this aspect of the invention, detection of a surge trend does not require that the actual sensed mass air flow and pressure ratio fall outside the shaded region of the compressor map of FIG. 8. Instead, proximity to the boundary line suggests a surge/choke trend that can trigger an appropriate response by the ECM 30.

More specifically, for a certain pressure ratio, the lower boundary polynomial $f_2$ can be used to calculate a corrected mass air flow value. This corrected mass air flow value can be compared against the value, $\dot{m}_c$, generated by the calculation module 86 in the rationality test module 80 depicted in FIG. 5. If the difference between the polynomial calculated value and the sensor calculated values for corrected mass air flow exceed a pre-determined, but small number, a compressor surge trend can be identified. With this information, the diagnostic routine 45 can direct the engine control routines of the ECM 30 to undertake peremptory corrective measures, such as derating the fuel or increasing the engine speed, to avoid the occurrence of compressor surge. This same approach can be applied to determine a choke trend as the compressor operation approaches the upper boundary line defined by the polynomial $f_1$.

To make this determination, the diagnostic routine 45 evaluates the difference between the actual mass air flow and the calculated value from the appropriate polynomial ($f_1$ or $f_2$). In one specific embodiment, the routine evaluates the following relation:

$|\dot{m}_c - f_2| < \epsilon_1$, where $\epsilon_1$ is a predetermined limit value.

If this difference value is less than the small predetermined limit value $\epsilon_1$, a surge trend has been identified. A similar diagnosis can be made by subtracting the mass flow rate from the upper boundary polynomial $f_1$.

Alternatively, an actual compressor surge condition can be detected using the same third order polynomials described above. In this instance, the number of times the difference between the calculated and sensor mass air flow changes sign over a short duration of time can be evaluated. In other words, a rapid passage of the compressor performance back and forth across the surge line 121 is indicative of the onset of a surge cycle, which cycle can be represented by the loop shown in FIG. 8. Again, if a surge cycle is detected, corrective measures can be taken. A similar approach can be applied to the upper boundary line 120, which corresponds to a choke cycle.

The diagnostic routine 45 can thus include software to evaluate the following conditional relationships:

IF $[\dot{m}_c(t_i) - f_2(t_i)] > \varepsilon_2$, and $[\dot{m}_c(t_{i+1}) - f_2(t_{i+1})] < -\varepsilon_2$, then the compressor is in a surge condition. A similar determination can be made substituting the first polynomial equation. The time values $t_i$ and $t_{i+1}$ can correspond to successive passes through the program steps in the flowchart of FIG. 3. Preferably, the conditional statement is evaluated at predetermined time intervals that are sufficiently long to detect a fluctuation in compressor operation. In a modification of this evaluation, the number of times that the compressor operation crosses one of the boundary lines 120 or 121 can be counted and compared with a pre-set threshold count indicative of a surge or choke condition.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, the rationality tests depicted in the block diagram so of FIGS. 4 and 5, as well as the surge/choke rationality test, utilize polynomial equations. These equations can be replaced with a data table and table look-up approach, in which the data table emulates the particular polynomial relationships.

It is understood that the preferred embodiments described above rely upon software routines contained within the ECM 30. However, a separate module can be provided that receives sensor data and outputs error or control signals to the ECM as necessary based on the outcome of the various rationality checks.

In addition, the illustrated embodiments received data from five sensors. In some instances, some sensor values can be eliminated, such as the ambient temperature value, with appropriate changes to the rationality tests for the remaining sensors.

What is claimed is:

1. For a turbocharged engine having an engine control module operable to control engine operation in response to data received from a plurality of sensors, a method for diagnosing abnormal turbocharger compressor operation, comprising the steps of:
storing, in a memory, data corresponding to a compressor operation map defining a region of normal compressor operation between a surge line and a choke line, a surge region outside the surge line and a choke region outside the choke line, the surge line and choke line being defined according to a predetermined relationship between a first and a second compressor operating parameter;
conducting a rationality test on the data received from selected ones of the plurality of sensors and generating an error signal if one or more of the selected sensors fails the rationality test;
if all sensors pass the rationality test, generating actual values for the first and second operating parameters from the sensor data; and
comparing the actual values with the compressor operation map and generating an abnormal operation signal if the actual values fall outside a predetermined relationship with the choke line or the surge line.

2. The method according to claim 1, wherein said step of conducting a rationality test includes conducting the tests in a predetermined order among the selected sensors.

3. The method according to claim 2, wherein the rationality test for successive sensors in the predetermined order utilize data from one or more of the prior sensors in the predetermined order.

4. The method according to claim 3, wherein the selected ones of the sensors include, in said predetermined order, sensors for boost pressure, ambient pressure, turbo speed and mass air flow at the engine air intake.

5. The method according to claim 4, wherein the rationality test for the turbo speed sensor utilizes data from the boost pressure and ambient pressure sensors.

6. The method according to claim 4, wherein the rationality test for the mass air flow sensor utilizes data from the boost pressure and ambient pressure sensors.

7. The method according to claim 1, wherein the rationality test includes:
storing, in the memory, data corresponding to a sensor rationality map defining a region of acceptable sensor performance between an upper boundary line and a lower boundary line, the upper and lower boundary lines being defined according to a predetermined relationship between a third and a fourth compressor operating parameter;
generating, from the sensor data, actual values for the third and fourth compressor operating parameters; and
comparing the actual values with the sensor rationality map and generating a failure signal if the actual values fall outside either the upper or lower boundary line.

8. The method according to claim 7, wherein the upper and lower boundary lines are defined by a second order polynomial relationship between the third and fourth operating parameters.

9. The method according to claim 8, wherein:
a selected one of the plurality of sensors is the turbo speed sensor;
the third compressor operating parameter is the compressor pressure ratio (PR);
the fourth compressor operating parameter is the turbo speed ($N_c$); and
the second order polynomial has the form;

$$PR = c_i N_c^2 + c_j N_c + c_k,$$

where $c_i$, $c_j$ and $c_k$ are predetermined constants.

10. The method according to claim 8, wherein:
a selected one of the plurality of sensors is the mass air flow sensor;
the third compressor operating parameter is the turbo speed ($N_c$);
the fourth compressor operating parameter is the mass air flow (MAF); and
the second order polynomial has the form;

$$MAF = c_i N_c^2 + c_j N_c + c_k,$$

where $c_i$, $c_j$ and $c_k$ are predetermined constants.

11. The method according to claim 10, wherein the third compressor operating parameter is a corrected turbo speed in which the actual turbo speed value from the turbo speed sensor is normalized as a function of the sensor value from the ambient temperature sensor.

12. The method according to claim 7, wherein:
the upper and lower boundary lines are defined by a predetermined relationship between the third and fourth operating parameters; and
the step of comparing the actual values with the sensor rationality map includes;
applying the actual value for the third operating parameter to the predetermined relationship to obtain a calculated value for the fourth operating parameter; and
comparing the actual and calculated values for the fourth operating parameter.

13. The method according to claim 1, wherein the surge line and the choke line are defined by a third order polynomial relationship between the first and second operating parameters.

14. The method according to claim 13, wherein:
the first compressor operating parameter is the mass air flow (MAF) at the engine air intake;
the second compressor operating parameter is the compressor pressure ratio (PR); and
the third order polynomial relationship has the form;

$$MAF = c_i PR^3 + c_j PR^2 + c_k PR + c_l,$$

where $c_i, c_j, c_k$ and $c_l$ are predetermined constants.

15. The method according to claim 1, wherein:
the first compressor operating parameter is the mass air flow (MAF) at the engine air intake;
the second compressor operating parameter is the compressor pressure ratio (PR); and
the step of comparing the actual values with the compressor operation map includes;
obtaining an actual value for the mass air flow from the sensor data;
calculating an actual compressor pressure ratio from the sensor data;
applying the actual compressor ratio to the predetermined relationship to obtain a calculated value for the mass air flow; and
comparing the actual and calculated values for the mass air flow.

16. The method according to claim 15, wherein the step of comparing the actual values with the compressor operation map further includes detecting a surge or choke trend by comparing the absolute value of the difference between the actual and calculated values for the mass air flow to a predetermined limit value.

17. The method according to claim 15, wherein the step of comparing the actual values with the compressor operation map further includes detecting a surge or choke cycle by comparing the difference between the actual and calculated values for the mass air flow at a first time with the difference between the actual and calculated values for the mass air flow at a second different time.

18. The method according to claim 17, wherein the step of comparing the actual values with the compressor operation map includes generating an abnormal operation signal if the sign of the difference at the first time is different from the sign of the difference at the second time.

19. For a turbocharged engine having an engine control module operable to control engine operation in response to data received from a plurality of sensors, a method for diagnosing abnormal turbocharger compressor operation, comprising the steps of:

storing, in a memory, data corresponding to a compressor operation map defining a region of normal compressor operation between a surge line and a choke line, a surge region outside the surge line and a choke region outside the choke line, the surge line and choke line being defined according to a predetermined relationship between a first and a second compressor operating parameter;

generating actual values for the first and second operating parameters from the sensor data; and applying the actual value for the first operating parameter to the predetermined relationship to obtain a calculated value for the second operating parameter;

comparing the actual and calculated values for the second operating parameter and generating an abnormal operation signal if the comparison exceeds a predetermined limit.

20. The method according to claim 19, wherein the step of comparing the actual and calculated values includes comparing the difference between the actual and calculated values for the second operating parameter to a predetermined limit value.

* * * * *

UNITED STATES PATENT AND TRADEMARK OFFICE
CERTIFICATE OF CORRECTION

PATENT NO. : 6,298,718 B1
DATED : October 9, 2001
INVENTOR(S) : Yue Yun Wang

It is certified that error appears in the above-identified patent and that said Letters Patent is hereby corrected as shown below:

Column 8,
Line 54, delete "$f_2=c_{20}N^{c2}+c_{21}N_c+c_{22}$," and insert -- $f_2=c_{20}N_c^2+c_{21}N_c+c_{22}$ --.

Signed and Sealed this

Twenty-sixth Day of March, 2002

Attest:

JAMES E. ROGAN
*Attesting Officer*    *Director of the United States Patent and Trademark Office*